INVENTORS: F. A. COWAN
H. A. RHODES
BY
William R. Ballard
ATTORNEY

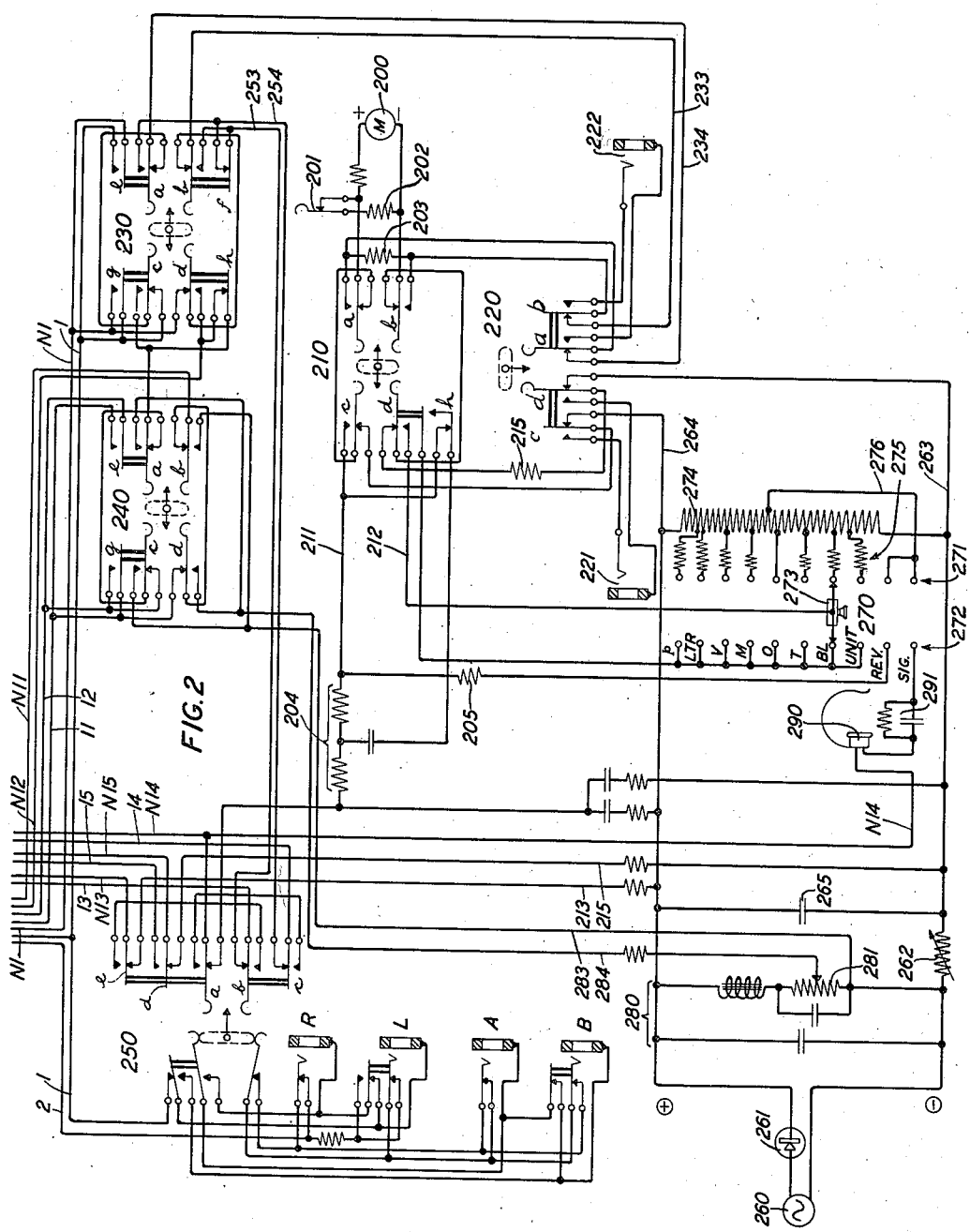

Nov. 12, 1940.  F. A. COWAN ET AL  2,221,129
TELEGRAPH DISTORTION MEASURING SYSTEM
Filed Jan. 24, 1939   3 Sheets-Sheet 3
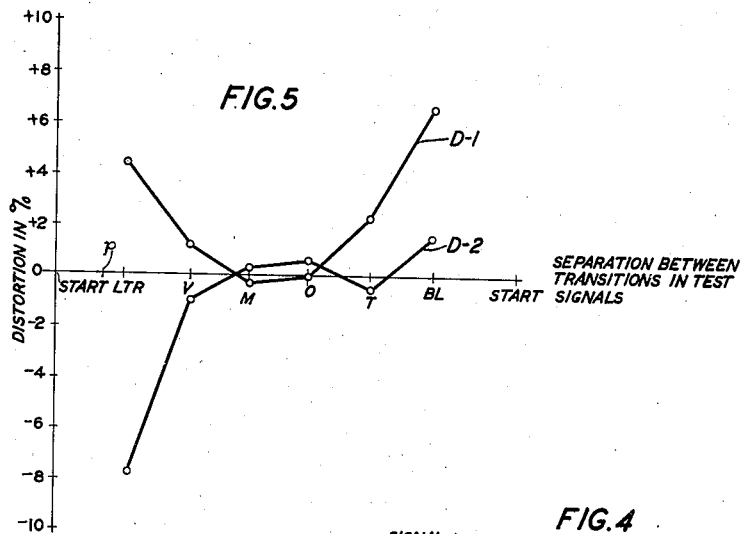
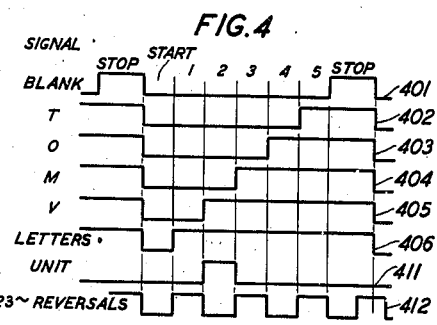
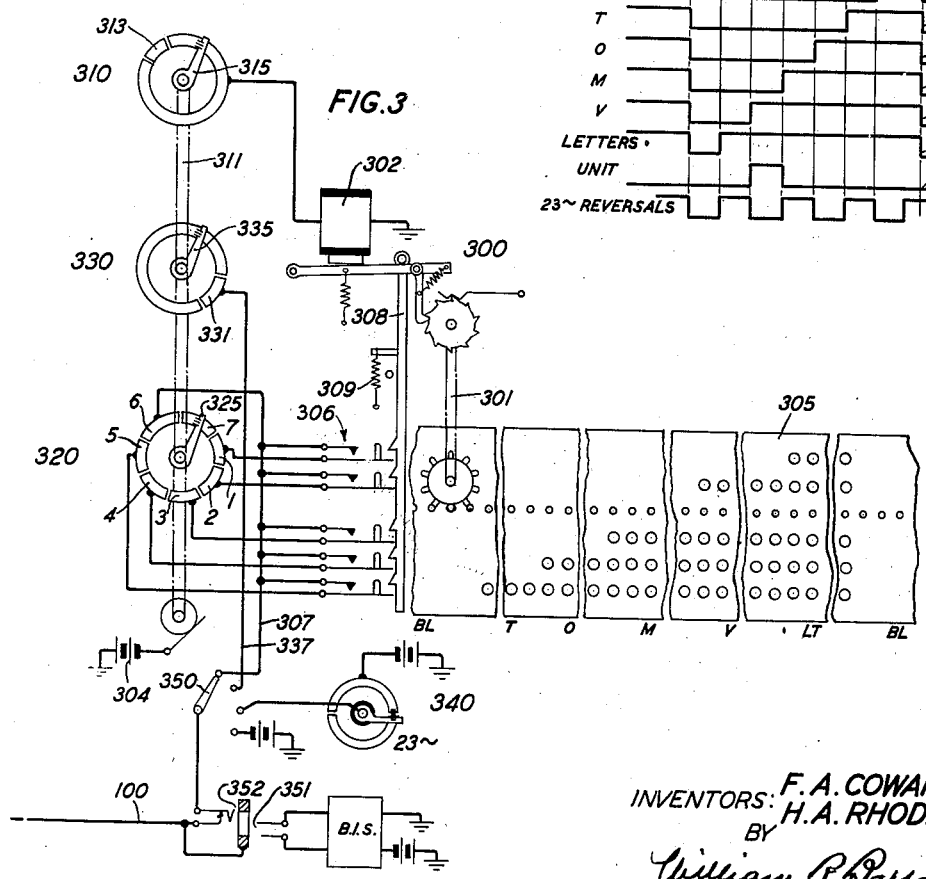
INVENTORS: F. A. COWAN
H. A. RHODES
BY
William R. Ballard
ATTORNEY Patented Nov. 12, 1940

2,221,129

UNITED STATES PATENT OFFICE 2,221,129

TELEGRAPH DISTORTION MEASURING SYSTEM

Frank Augustus Cowan, New York, N. Y., and Harold Anson Rhodes, Bloomfield, N. J., assignors to American Telephone and Telegraph Company, a corporation of New York Application January 24, 1939, Serial No. 252,679

7 Claims. (Cl. 178—69)

This invention relates to telegraph measuring systems and particularly to measuring systems adapted to measure distortion suffered by start-stop telegraph signals in their transmission over a telegraph line circuit.

It is an object of the invention to provide a measuring system arranged to determine the distorting effect of a line circuit upon a plurality of different test characters of the start-stop type to obtain a series of observations.

A further object is to provide a distortion measuring system by which it is possible to separate the various types of distortion involved in the total distortion of the start-stop test signals due to their transmission over the line circuit and thereby obtaining information which may be used conveniently in taking steps to overcome the distorting effects.

It is another object of the invention to provide a measuring set of this type which is portable and therefore is suitable for use at subscribers' stations.

In the measurement of telegraph signal distortions it has been customary in the past to select a single test character or a test series of impulses representing a character in accordance with a code, to transmit such a character over a line circuit under observation and to receive the signals at the other end of the line circuit in a metering circuit. The test series of impulses were selected with the object of transmitting a combination of marking and spacing impulses which would be most likely to suffer a large distortion in line circuits of the various types used in the telegraph plant. The meter circuit included an integrating meter responsive to both the marking and spacing impulses of the test series and therefore gave a comparatively steady indication on the scale of the average distortion. Since the test series included a biasing effect, inherent thereto and due to the ratio between the marking and spacing intervals, the meter circuit was arranged to compensate for this inherent time bias so that the meter would give a zero reading when the selected test series passed over the line circuit without distortion.

In recent years the start-stop system of telegraph service has been greatly expanded both in the number of subscribers and in the length of the individual subscriber's line circuits. It is, therefore, becoming more important to improve this service in respect to both the line conditions and the sending and receiving station equipment.

In accordance with the invention, a measuring system is provided which is particularly adapted for use in the start-stop telegraph plant and for giving information which will serve in the determination and correction of faulty conditions in line equipment as well as station equipment. The system is particularly adapted for the determination of the various principal causes of such conditions with great accuracy. The system is arranged to operate systematically in accordance with a predetermined scheme whereby the conditions peculiar to the start-stop method of transmission are taken definitely into account and whereby a series of observations is provided in each case so that an experience may be built up and definite conclusions may be drawn from the observations in any particular case.

As is well known the distortions due to various causes may be grouped in different manners. Thus it has become customary to distinguish between systematic distortion, which usually is due to causes within the system, and fortuitous distortion, which is usually due to external causes such as cross-fire and power interference. The systematic distortion may further be divided into symmetrical distortion, such as signal bias, and unsymmetrical distortion which particularly includes the so-called characteristic distortion due to reaction between successive signal impulses. Since the characteristic distortion is dependent upon the impulse combination, it is evident that the start-stop code which includes a stop impulse approximately one and one-half times as long as the unit impulses of the code will establish a special condition affecting the characteristic distortion which is not found in systems using a series of impulses of uniform length. It is therefore one feature of the invention to select the test series with a stop impulse corresponding to that used in the commercial operation of the system and thereby include the specific effect of the longer stop impulse as it will influence the normal operation of the system and its equipment.

It has been customary also to use miscellaneous test characters, as in a standard test sentence of appreciable length. This procedure gave an average distortion reading which approached the average time bias inherent to the signals and thus was not suited to supply information as to the extent of the characteristic distortion. Since the characteristic distortion of a particular impulse may be due not only to the preceding impulses within the character but also to impulses of a preceding character, it is evident that there is an infinite number of possible combinations that may influence each impulse and that, of the cases which produce serious distortion, some will occur at rarer intervals and cause only occasional errors in reception, whereas others occur more frequently and may constitute a serious cause for complaint. In accordance with a feature of the invention a set of test characters have been selected for successive observation in a standardized procedure, the test characters each comprising the start transition which in commercial practice is from marking to spacing, and a subsequent transition from spacing to marking; the second or reverse transition is timed in the different characters of the set of test characters to occur at each of the normal six transition points of the seven and one-half unit start-stop code. In the case of a code containing more than seven and one-half units the number of characters included in the set of test characters may be correspondingly increased. In this manner a simple code is used which includes a single variation covering the entire range of the seven and one-half unit code, which includes transition points actually in use during commercial operation, and which will give fundamental information as to the distorting effect of the line circuit.

The production of the proposed set of test characters can be accomplished by simple means and a definite routine for observations in response to the different test characters may readily be established. In this manner, comparative information may be collected for different types of circuits and a routine may be established for correction of the causes of distortion. In special cases where serious distortion arises due to certain combinations of impulses not present in the test characters, specific tests may be conducted to provide additional indication of the necessary remedies. The selection of six test characters, such as just described, has the advantage over the prior use of a single test character sent directly and reversed that in a great majority of cases the maximum possible distortion will be ascertained.

In accordance with the invention, the meter circuit includes a relay responsive to incoming signals, a source of potential having its plus and minus terminals connected to the marking and spacing contacts, respectively, of the relay, an adjustable potential divider connected across the source and an integrating meter connected between the relay armature and the adjustable potentiometer point. With the divider adjusted in zero position and with the test characters arriving over the line circuit in undistorted condition, the meter would show the inherent bias of each repeated test character and thus would establish six points of zero distortion on the meter scale. With the same adjustment and with distorted test characters the meter would deflect from each of the established scale points for each of the test characters by the amount of the distortion. It is evident that in such an arrangement the distortions would be read on a small scale of limited accuracy. In accordance with the invention the potential divider is made adjustable to six predetermined points. When the divider is adjusted to the point corresponding to a particular test character, the meter will indicate at zero when the signal is undistorted and will deflect to one or the other side of the zero point, in response to positive or negative distortion of the signal; in this manner the entire scale of the meter may be used to indicate distortion and a high degree of accuracy is obtained.

The invention will now be described as applied to a particular embodiment adapted for use at certain commercial subscribers' stations. The commercial plant includes subscribers' stations of various types but the relays used in the various types generally are of two types, namely, a simple type having only two-relay windings and a more complicated type having six windings. The embodiment of the invention disclosed herein is especially adapted for operation with both types of relays.

The measuring set proper is connected by means of a cord and a special plug to the subscriber's set, the plug being designed to fit the contact socket for the subscriber's relay; the relay is therefore first removed and the plug is inserted in its place. This plug is particularly adapted for replacing the six-winding relay referred to above. An adapter is provided for use with a relay socket of the simpler type, the adapter having a plug portion for insertion in the simple relay socket and a socket portion similar to the base of the six-winding relay and therefore adapted to receive the plug of the measuring set.

The measuring set may be provided with a receiving relay of any type for operation of the meter, however, in the preferred embodiment, the set includes relay sockets for insertion of the relay removed from the subscriber's station. Thus the set includes a socket for insertion of the six-winding relay, connected for normal operation of the relay, and another similar socket for the same relay but with connections reversed for the purpose of measuring relay bias; the set further includes a socket adapted to receive the two-winding relay and a key is provided for reversing the connections thereto.

By this arrangement the various windings of either type of relay are connected through sockets within the set over the cord and plug through the socket of the subscriber's station to the line circuit so that the relays will respond to incoming signals from the line in the normal or the reverse manner. The contacts of the relay are normally connected to operate the meter but may be switched to operated the subscriber's printer.

Provision is also made for using the set without using the special plug; for this purpose jacks of the usual type and connected to the relay windings in the measuring set can be connected by patching cords directly to a jack in the circuit to be measured.

The measuring set also includes various keys for connecting the meter as a voltmeter or an ammeter to different points within the set as well as to external sources.

The invention will now be described more in detail as to its equipment, as incorporated in a test set of preferred form, and its method of operation in measurements at two different types of subscribers' stations and reference will be had to the accompanying drawings in which:

Figures 1 and 2 show a diagrammatical layout of the circuit and certain of the mechanical features of a measuring set arranged in accordance with the invention; Fig. 1 also shows two different types of subscribers' stations and their line circuits as terminated at a central office in a special transmitting equipment. For the purpose of tracing the circuit, Fig. 1 should be placed above Fig. 2;

Fig. 3 shows diagrammatically a convenient equipment for sending special test characters from the central office to the line circuit under observation, and particularly shows a tape specially perforated for the production of desired test signals in accordance with the invention.

Fig. 4 shows diagrammatically a series of different test signals used in the tests in accordance with the invention; and Fig. 5 shows typical curves constructed from meter readings obtained in tests of two different types of line circuits.

Figure 1:
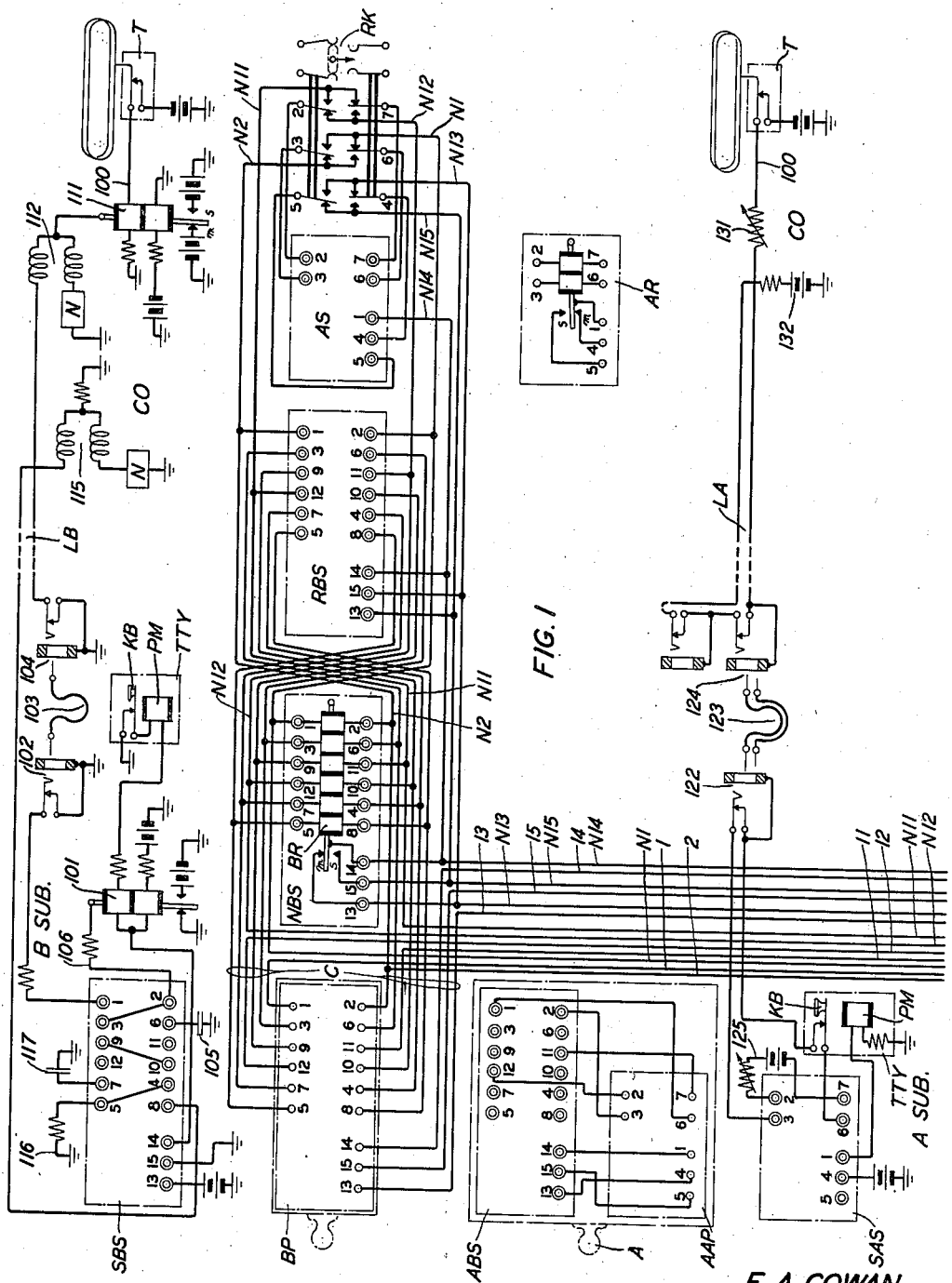

In the following description, it will be assumed that two types of subscribers' stations and their line circuits are to be checked in regard to distortion of the incoming signals.

Thus in Fig. 1 there is shown one type of subscriber's station A provided with a teletypewriter equipment TTY and connected over a jack 122, double cord 123 and jack 124 to a line circuit LA leading to a central office CO. The subscriber's station includes a relay socket SAS having a plurality of contact members 1 to 7 adapted to engage corresponding contact members in the relay base of a two-winding relay, shown at AR as having been removed from the socket SAS. When, under normal communicating conditions, the relay AR is inserted in the socket SAS the biasing winding 2—7 is connected through contacts 2—7 of the socket to circuit 125 including a source of biasing current and a resistance for bias adjustment; the operating winding 3—6 of relay AR will be connected over contacts 3—6 of the socket SAS to the line circuit which includes the keyboard KB of the teletypewriter TTY and the tip and sleeve of jack 122; the armature 1 and marking contact 4 of relay AR will be connected over contacts 1 and 4 in socket SAS to the printer circuit including the printer magnet PM of the teletypewriter TTY and the source at contact 4.

When the cord 123 is inserted in both jacks the line circuit is completed from the source 132 at the central office over the tip circuit through the operating winding 3—6 over the keyboard KB and the sleeve circuit through line current resistance 121 to the transmitter T at the central office. The signals from transmitter T thus pass through the operating winding 3—6 of relay AR which opens and closes the circuit 4—1 through the printer magnet, operating the printer. The keyboard contacts KB are included in this circuit to open it for a break signal and to transmit impulses to the central office, the receiving equipment at the central office being omitted from the drawings since it has no bearing on the understanding of the invention.

Fig. 1 also shows the other type of substation B, which includes a relay base SBS having contacts 1 to 15 adapted to engage corresponding contacts in the base of relay BR, which is shown inserted for test purposes in the socket NBS of the measuring set. In the normal communicating condition the relay BR is inserted in the socket SBS. This station also includes a polar relay 101 and the teletypewriter TTY, and may be connected over jack 102, cord 103 and jack 104 to the lower conductor of the line circuit LB and to the transmitting equipment at the central office CO including relay 111 and transmitter T. With the relay BR inserted in the subscriber's B type socket SBS the following circuits are established: The line circuit over tips of jack 104, cord 103, jack 102, operating winding 1—2, armature and marking contact of relay 101 to ground; a balancing circuit is also established from winding 1—2 through winding 3—6, balancing network 105 to ground; another circuit is established as follows: from ground or battery over spacing contact 15 or marking contact 13, respectively, at socket SBS, over armature 14 of relay RB through the upper winding of relay 101, the printer magnet PM and keyboard KB; a balancing circuit is also established from armature 14 through the lower winding of relay 101 to battery. Thus relay BR responds to incoming signals and in turn operates the printer magnet without operating relay 101; when keyboard KB is operated relay 101 operates and applies alternately ground and battery through the operating windings of relay BR to the line circuit without operating relay BR. The central office equipment particularly adapted for this type of line includes, besides the special transmitter T for producing test signals, a relay 111, the upper winding of which is responsive to the test signals and operates the armature to alternately apply marking and spacing potentials through a balancing circuit 112 to the line circuit LB. For improvement of operation of relay BR, a neutralizing circuit is established through the balancing circuit 115 at the central office CO over the upper conductor of the line LB through windings 8—5 and 4—7 to ground 116 and through balancing network 117. The windings 9—11 and 10—12 of relay BR may be used for biasing of the relay in certain types of subscribers' stations.

*Description of the measuring equipment*

An adapter A comprises a plug portion AAP of the A-type having contacts 1—7 arranged exactly as those in the base of the A-type relay AR; this plug AAP may therefore readily be inserted in the socket SAS of the subscriber's station after the relay AR has been removed. The adapter furthermore includes a socket portion ABS of the B-type having contacts 1 to 15 arranged exactly as those in the B-type relay socket SBS. The contacts in plug AAP and socket ABS of the adapter are properly interconnected for use with the measuring set.

A cord C from the measuring set is terminated in the B-type plug BP which has contacts 1 to 15 arranged exactly as the contacts in the B-type relay base; the plug BP may therefore be inserted in the subscriber's B socket SBS or in the adapter socket ABS connected with the A subscriber.

The measuring set includes, as shown in Fig. 1, two B-type sockets NBS and RBS, each having contacts 1 to 15 arranged exactly as those in the B-type relay base; thus relay BR may readily be inserted in either of the sockets NBS and RBS. The measuring set further includes an A-type socket AS with contacts 1 to 7 arranged exactly as those in the A-type relay base so that relay AR may be inserted therein.

The plug BP is connected through the conductors of the cord C so that, when relay BR is inserted in socket NBS, the relay windings will be connected in the normal manner to the B subscriber's circuit; when relay BR is inserted in the socket RBS the windings will be connected to the B subscriber's circuit in a reverse manner. When relay AR is inserted in the socket AS, the windings will be connected to the A subscriber's circuit in the normal manner, when the key RK is in the position shown, and in a reverse manner, when the key RK is thrown to its lower position.

As shown in Fig. 2, the measuring set further includes the meter 200 which is normally operated with the shunt 202 connected through key 201 for one scale of deflection and may be operated without the shunt to increase its sensitivity and to indicate on a different scale.

The meter is connected through three-position key 210 over the normal contacts a, b and c, d and through the voltmeter resistance 215 and two-position key 220 over normal contacts c, d to measure the potential on the conductors 264 and 263. With key 210 in right-hand position the meter is shunted by resistance 203 to operate as an ammeter and is connected through key 220 over normal contacts a, b to conductors 233 and 234 leading to the key 230. When key 220 is operated the meter is connected in normal position of key 210 to jack 221 and in right-hand position of key 210 to jack 222, for the purpose of measuring voltage or current, respectively, in external circuits. When the key 210 is operated to its left-hand position, the meter is connected to conductors 211 and 212 for the purpose of measuring distortion. The measuring set may be connected to an available source of alternating or direct current 260 through rectifying equipment 261 of any convenient design supplying a positive potential to conductor 264 and negative potential through voltage regulator 262 to conductor 263. A circuit 280 comprising a potentiometer 281 and a filter arrangement of condensers and inductance is arranged for supplying a variable biasing current over conductors 283 and 284 through the key 240 to the biasing windings of the relay inserted in any one of the test sockets.

The potential divider 270 is provided for the purpose of compensating in the meter circuit for the inherent time bias of the different test signals at normal speed of transmission. The divider comprises two rows of contacts 271 and 272 and a slide member 273 arranged to engage any two opposite contacts in the two rows. Contacts 271 are connected through resistances 275, properly adjusted, to a series of fixed points on the potentiometer 274; the potentiometer is connected between the plus conductor 264 and minus conductor 263 and thus supplies a graduated potential to the slide 273; the mid-point of the potentiometer is connected to the two lowermost contacts in row 271. Six positions of the slide 273 are marked in accordance with the letters on a teletypewriter corresponding to the selected test signals; one position is marked UNIT and corresponds to a signal series having a single marking unit impulse; another position is marked REV and corresponds to a test series of 23 cycles per second reversals; the bottom position is marked SIG and is arranged to provide for reception of an audible signal in the receiver 290 connected through network 291 for observation of the armature operations of the relay inserted in the measuring set.

A high capacity damping circuit 204 is arranged to be connected across the meter during distortion measurements when the key 210 is in its left-hand position and the slide 273 is operated over the six character contacts in row 272.

The two-position key 250 is provided to, in its normal position, supply current from conductors 263 and 264 in the measuring set. When the key is in its right-hand position the contacts of the relay under test will be connected through the plug BP to the station equipment of the subscriber to permit the operator of the test set to communicate with the central office by operating the keyboard on the subscriber's teletypewriter and by operation of the printer magnet PM through the relay inserted in the measuring set; under this condition the meter circuit is disconnected from the signaling circuit.

For the purpose of operating the measuring set at a subscriber's station, a special transmitting equipment T may be used at the central office CO. This equipment is shown diagrammatically in Fig. 1 and a more detailed schematic arrangement of an equipment suitable for this purpose is shown in Fig. 3.

Referring to Fig. 3, the transmitting equipment comprises a tape transmitter 300, distributing mechanism 320 for timing the signal combinations produced by the tape transmitter, a unit impulse producing distributor 330, a source of reversals 340 and a switching device 350 for connecting the various impulse sources successively to the output circuit 100 which, as shown in Fig. 1, may be extended through other equipment in the central office to the lines LA or LB.

The tape transmitter 300 may be of any well-known construction. In the form shown in the drawings it comprises a tape feeding mechanism 301 operated by a magnet 302 which receives impulses over a segment 313 and brush 315 of distributing device 310 from battery 304 applied through suitable slip rings.

The tape 305 is preferably formed into a continuous loop as indicated in Fig. 1 and has the usual row of feed holes. The code perforations are arranged as usual in five rows representing the character impulses of the start-stop code and are further arranged to successively produce the six different test characters, referred to above, during successive intervals.

The transmitting device 300 comprises a set of five pairs of contact springs 306, each pair having one member adapted to engage the tape and to be operated in accordance with the presence or absence of perforations in the tape in the row aligned with the member. In the absence of a perforation the contact pair will be opened, in the presence of a perforation the contacts will be closed. The five pairs of contacts 306 serve to complete a circuit from the battery 304 over corresponding segments in the distributor 320 through the conductor 307 which connects through the first position of switch 350 to the output conductor 100.

The tape engaging members of the contacts 306 may be removed from engagement with the tape by a suitably arranged member 308 during the advancement of the tape by magnet 302; the member 308 under the influence of spring 309 tends to hold the contacts 306 open and out of engagement with the tape; the member 308 is, however, moved out of engagement with the contacts 306 when the armature magnet 302 is attracted upon completion of its movement to advance the stepping device 301.

The distributing device 330 has a segment 331 arranged to produce a single impulse of unit length over the conductor 337 which extends over the second position of switch 350 to the output conductor 100.

Each of the distributing devices 310, 320 and 330 comprises a stationary ring of segments engaged by a traveling brush on continuously rotating brush arms 315, 325, 335, respectively. The segments of the distributing device 320 are arranged to produce the standard start-stop code impulses and thus comprise six unit segments 7, 1, 2, 3, 4, 5, of equal length and a stop segment 6 the length of which is 1.42 times the length of the unit segments. The start segment 7 having no connections will produce a spacing impulse;

the character segments 1, 2, 3, 4, 5 will produce space or mark impulses in accordance with the setting of the contact pairs 306 in the transmitting device 300; the stop segment 6 is permanently connected to produce a marking impulse. The distributing device 330 has a segment 331 of unit length and placed to time this impulse to occur at an instant corresponding to the passage of brush 325 over segment 2 of the distributor 320. The distributing device 310 has a segment 313 arranged to transmit an open impulse to the magnet 302 during the stop impulse produced by segment 6 of the distributor 320.

The continuously revolving arms 315, 325 and 335 are mounted on a common shaft 311 driven at constant speed to produce impulses by distributor 320 at the same speed as used in commercial operation.

In the third position of switch 350 the output conductor 100 will be connected to a source of reversals 340 arranged in any convenient manner to, for example, produce impulses each of normal unit length which thus will represent an alternating current frequency of approximately 23 cycles per second. Other frequencies may be used, if desired. The fourth position of switch 350 connects steady marking potential to output conductor 100.

The transmitting equipment shown in Fig. 3 is capable of producing a plurality of test signals such as shown in Fig. 4.

Thus the tape transmitter in combination with distributor 320 will produce the test characters 401 to 406 in the first position of switch 350; the distributor 330 will produce the signal 411 in the second position of switch 350; the source of reversals 340 will produce the signal 412 in the third position of switch 350.

The test characters produced by the tape 305 comprise the start impulse, the five character impulses of unit length and the stop impulse of 1.42 times the unit length. Each character will include the start transition from mark to space and a subsequent transition from space to mark, this reversed transition occurring before the stop, fifth, fourth, third, second and first impulse period in the signals 401 to 406 respectively, in accordance with the perforations in tape 305. These signals correspond to the following assigned characters in the commercial teletypewriter BLANK, T, O, M, V, LETTERS.

*Method of operation in connection with a B-type subscriber*

The operation of the system will now be described as it will take place in a particular test. It will be assumed that the test set is located at the B subscriber shown in Fig. 1 and that it is planned to test the lower signaling conductor of the line LB and the equipment at the subscriber's station.

Upon request from the test operator the transmitting set T at the central office CO is connected to the line equipment associated with the line LB. The relay BR is then removed from the subscriber's B socket SBS and inserted in the normal B socket NBS of the test set; the plug BP is inserted in the socket SBS. The power circuit of the test set is connected to an alternating current supply 260. The cord 103 is inserted in jacks 102, 104. All the keys in the test set are in normal position as shown in the drawings.

At the central office the switch 350 is in the first position as shown in Fig. 3 and the distributor shaft is running at normal speed. The tape 305 is being advanced one step for each revolution of shaft 311 over a section having no perforations; all the contact pairs 306 will therefore remain open and only the stop impulse will be produced by distributor 320.

Key 210 will now be operated to the right.

The circuit for transmitting impulses may then be traced as follows: from battery 304, over brush 325, segment 6, conductor 307, switch 350, conductor 100, operating winding of relay 111 to ground; this circuit will be open on all segments except segment 6 of distributor 320. With the circuit 100 closed relay 111 will be in marking position applying positive battery to the line circuit LB; with circuit 100 open relay 111 will operate to spacing applying minus battery to the line circuit LB. The impulses from the armature of relay 111 pass over the lower signaling conductor, tip circuit of jack 104, cord 103 and jack 102 to contact 1 of socket SBS and plug PB, over conductor 1, normal contact c and a of key 230, conductor 234, normal contact a of key 220, alternate contact a of key 210 through shunt 203 and meter 200, alternate contact b of key 210, normal contact b of key 220, conductor 233, normal contacts b and d of key 230, conductor N1, contact 1 of normal B socket NBS and of relay BR, through winding 1—2 of the relay over contacts 2 of relay BR and socket NBS, contacts 2 of plug BP and subscriber's socket SBS, conductor 106 through armature of relay 101 to ground. Relay BR responds in this circuit by operating its armature to marking in response to current through its winding 1—2 from marking battery at the central office, that is, during the stop impulse, and by operating its armature to spacing in response to current through its winding 1—2 from spacing battery at the central office, that is, during the start and the character pulse periods. In the circuit just traced the meter 200 measures the line current through winding 1—2 of relay BR.

Key 230 is now operated to its right-hand position and the meter circuit over normal contacts c and d is now short-circuited by alternate contact e which completes the previously traced line circuit over conductors 1 and N1 independently of the meter circuit.

With keys 210 and 230 in their right-hand positions the meter circuit may now be traced as follows: from battery through contacts 13 of subscriber's B socket SBS and plug BP, conductor 13, normal b contact of key 250, conductor 253, alternate b contact of key 230, conductor 233, normal b contact of key 220, alternate b contact of key 210, through the meter, alternate contact a of key 210, normal contact a of key 220, conductor 234, alternate contact a of key 230, conductor 254, normal contact c of key 250, conductor 14, contacts 14 of plug BP and socket SBS through the upper winding of relay 101, printer magnet PM and keyboard KB to ground. In this circuit the meter measures the normal current through the printer magnet. When key 230 is in the center or the left position the meter circuit just traced will be bridged by normal contacts f which thus will complete the circuit for the printer magnet independently of the meter circuit.

Key 230 is now operated to its left position. The line circuit over conductors 1 and N1 is now completed by alternate contact g independently of the meter circuit.

Key 210 is then returned to its normal position and the meter circuit will be extended over normal contacts a, b and c, d of key 210 and normal contacts c, d of key 220 to conductors 263 and 264; in this circuit the meter measures the potential across the potentiometer 274; this potential may be adjusted by means of resistance 262 to approximately ninety volts.

Key 210 is now moved to its left-hand position which will associate the meter with the contacts of relay BR. This circuit may be traced as follows: from plus conductor 264 over conductor 213, normal contact e of key 250, conductor N13, contacts 13 of socket NBS and relay BR to the marking contact and armature of relay BR, contacts 14 of relay BR and socket NBS, conductor N14, normal contact a of key 250, resistance branch of network 204 for highly damping the meter, conductor 211, alternate contact c and normal contact a of key 210 through the meter, normal contact b and alternate contact d of key 210, slide 273 of potential divider 270 where the circuit divides to the left over contact BL, alternate contact h of key 210 and the damping condenser in network 204; the circuit divides to the right at slide 273 over contact BL to a point on the potentiometer which completes the circuit to plus conductor 264 and minus conductor 263. Another circuit is established from minus conductor 263 over conductor 215, normal contact d of key 250, conductor N15, contacts 15 of socket NBS and relay BR to the spacing contact of relay BR. Thus as relay BR operates to marking and spacing plus and minus potential on conductors 264 and 263 will be applied through the damping circuit 204 and the meter 280 and to the potentiometer point of divider 270 which corresponds to the test character 401, produced by the unpunched portion of tape 305 which is assumed to be passing through the transmitter 300 at the present time.

In this position of slide 273 one side of the meter will be connected to a comparatively high negative potential and the other side of the meter will be connected alternately to full plus and minus potential in accordance with signal 401, but the plus potential is applied for a short interval compared with the long interval of minus potential; the potential ratio at this point of the potentiometer is fixed so that it compensates for the normal time ratio of the mark and space impulses in the test signal 401 and the meter consequently will show zero deflection in the absence of distortion. In the case of distortion whereby the marking impulse is shortened and the spacing impulse lengthened relative to their normal lengths, the meter will deflect to indicate negative or spacing distortion, and the deflection will be proportional to the deviation from the normal ratio between lengths of the marking and spacing impulses, and the meter may be calibrated to give the distortion in per cent. In case the marking impulse is lengthened and the spacing impulse shortened the meter will indicate positive or marking distortion in per cent.

The test operator makes note of the distortion indicated by the meter during the transmission of the 401 signal.

When the tape 305 advances to the portion having perforations in the lower row corresponding to the letter T the lowermost pair of contacts 306 will be closed once for each perforation while the distributor brush 325 passes over segments 1 to 5; battery 304 will therefore be applied over distributor 320 and the closed contact pair 306 when brush 325 reaches segment 5 to conductor 100; battery 304 will be applied directly during the passage of brush 325 over segment 6 as before. The transmitted signal will therefore have spacing and marking intervals as shown for the signal 402 of Fig. 4 corresponding to the letter T.

Since the balance established on the potential divider 270 in the BL position no longer is effective, the meter needle will deflect beyond its scale and the test operator, observing this, moves slide 273 to position T; in this position the potential ratio applied to one side of the meter through the potentiometer 274 is fixed so that the meter will again point to zero in response to the T signal and in the absence of distortion. In the presence of distortion, that is, when the ratio of marking to spacing interval of signal 402 is decreased or increased in respect to the normal ratio the meter will indicate negative or positive distortion in per cent as before. The test operator makes note of the meter reading for the T signal.

As the tape 305 advances, perforations will appear successively also in the remaining rows thereby permitting additional pairs of contacts 306 to be closed and thereby applying battery over additional segments 4, 3, 2 and 1 of the distributor 320 to the conductor 100 and successively producing in the line circuit the signals 403, 404, 405 and 406 corresponding to the characters O, M, V and LETTERS. The test operator observing the meter will shift the slide 273 to the corresponding positions in the potential divider 270 and will note the distortion indicated on the meter for each test character.

The distortions recorded in this manner are the total systematic distortions since the highly damped meter will not be noticeably responsive to any fortuitous distortion that may arise during the test.

If desirable, the line bias may now be measured, in which case the test operator requests the application of 23 cycle reversals to the line circuit. In response to this request switch 350 is moved to its third position thereby connecting conductor 100 to a suitable source 340 for effecting such reversals. The signal applied to the line in this case is shown at 412 in Fig. 4.

Relay BR will consequently operate as before and in the absence of distortion will operate its armature for equal durations to the marking and spacing contacts. The test operator now moves slide 273 to position REV thereby connecting one side of the meter to the mid-point of potentiometer 274. In the absence of distortion the meter will show zero. In case of distortion when the armature of relay BR rests for a longer time than the normal dot period on the marking or spacing contact the meter will show positive or negative bias in per cent. It will be noted that in this position of slide 273 the previously traced circuit from the slide to the left now is opened, thereby disconnecting the damping condenser in circuit 204 from the meter and inserting over the left contact REV a resistance 205 in series with the meter circuit; resistance 205 is adjusted to give proper reading on the meter. The test operator makes note of the reading of the line bias.

For the purpose of determining the bias due to the relay BR itself this relay is now removed from the socket NBS and inserted in the socket RBS. It will be noted that the armature of the relay is connected over contacts 14 of socket RBS to contact 14 of socket NBS and consequently remains connected as before. The marking contact is connected over contact 13 of socket RBS to contact 15 in socket NBS and the spacing contact is connected over contact 13 of socket RBS to contact 15 of socket NBS. The marking and spacing contacts, therefore, have now been reversed with respect to the measuring set. It may similarly be traced that winding 1—2 is now reversed with respect to its former connections to the test set and that the other windings have been similarly reversed. The marking impulse incoming over the line circuit will now operate the relay to spacing but the relay in turn will operate the meter to marking; similarly a spacing impulse will operate the relay to marking and the meter to spacing. Thus the biasing effect of the relay has been reversed with respect to the meter reading and the meter reading is recorded.

For the purpose of measuring fortuitous distortions due to external sources relay BR is now returned to the socket NBS; the slide 273 is moved to position SIG thereby connecting one side of the meter to the mid-point of the potentiometer. The circuit to the left of slide 273 now extends over a contact in the row 272, a resistance capacitance network 291, a headset receiver 290 to conductor N14 which leads to the armature of relay BR to which also the other side of the meter is connected as previously traced.

Keys 210 and 240 are now operated to the right completing a biasing circuit for relay BR which may be traced as follows: from negative end of potentiometer 281, conductor 283, alternate contact b of key 240, conductor N11, through winding 11—9 of relay BR, through contacts 9 of plug BP and socket SBS, through a strap to contacts 10 of socket SBS and plug BP, through winding 10—12 of relay BR, conductor N12, alternate contact d and normal contact b of key 230, conductor 233, normal contact b of key 220, alternate contact b of key 210, through the meter, alternate contact a of key 210, normal contact a of key 220, conductor 234, normal contact a, alternate contact c of key 230, alternate contact a of key 240, conductor 284, to the adjustable contact of the potentiometer 281. Thus with key 210 operated to the right the meter is disconnected from the armature of relay BR and from the slide 273 and is instead included as an ammeter in the biasing circuit for relay BR indicating the biasing current.

At the test operator's request the switch 350 at the central office CO is now moved to its fourth position thereby applying steady marking potential to the line circuit.

In the presence of line interference relay BR will now receive an irregularly varied current in the marking direction through its operating winding 1—2 and, with a biasing current through windings 11—9 and 10—2 exactly opposing the steady value of the line current, the relay would be directly responsive to the interference currents in both the marking and spacing direction. The receiver 290 being connected from mid-point of potentiometer 274 to the armature of relay BR would consequently produce a click each time relay BR is operated in one or the other direction. The test operator now adjusts potentiometer 281 gradually from zero biasing current to the point where relay BR begins to be barely operated by the interference and the value of the biasing current at this point is read on the meter 200. The potentiometer is then moved further in the same direction, to increase the biasing current well beyond the point where the clicks again disappear and is gradually returned towards the point where relay BR again begins to respond to the interference, and record is made of the meter reading. From the nature of the clicks in the receiver it may be judged how the interference originated and notes to this effect may be made by the test operator.

To obtain a useful quantitative measure of the distorting effect of the observed interference the magnitude of the interference may be expressed by half the difference between the two meter readings of the biasing current just obtained, that is, the biasing current represented by half the difference between the two readings is that which was required to overcome the interference at its peak values in either direction. This calculated biasing current is usually called the peak interference current.

The corresponding distorting effect may now be determined. For this purpose the potentiometer 281 is adjusted until the meter indicates the peak interference value of the biasing current through the relay BR. The slide 273 is now returned to position REV and key 210 is operated to the left thereby connecting the mid-point of the potentiometer 274 to one side of the meter and connecting the other side of the meter to the armature of relay BR. At the test operator's request, switch 350 is returned to third position thereby again applying reversals to the line circuit. It will be noted that after switching to the left of key 210 the biasing circuit through relay BR, traced above, remains completed through the ammeter shunt 203 connected across the alternate contacts a and b of key 210.

The biasing current now flowing through the windings 11—9 and 10—12 of relay BR acts to bias the operation of the armature of relay BR and to an extent which corresponds to the particular adjustment of potentiometer 281. The meter reading obtained under this condition therefore may be taken as a measure of the distortion effects of the line interference.

The key 250 is provided to enable the test operator to communicate with the central office without removing or patching any connections. The key 250 may therefore be operated to the right with the object of disassociating the meter from the contacts of relay BR and associating these contacts with the substation teletypewriter TTY for communication with the central office. The windings of relay BR are unaffected by operation of key 250 but the contact circuits may now be traced from battery over contact 13 of socket SBS and plug BP, conductor 13, alternate contacts b and e of key 250, conductor N13 to the marking contact of relay BR in the measuring set; another circuit is traced from ground over contacts 15 of socket SBS and plug BP, conductor 15, alternate contact d of key 250, conductor N15 to spacing contact of relay BR; the armature of relay BR is connected over conductor N14, alternate contacts a and c of key 250, conductor 14, contacts 14 of plug BP and socket SBS through winding of relay 101 to the teletypewriter circuit. A balancing circuit is also established from the contacts of relay 101 over contacts 3 on socket SBS and plug BP through winding 3—6 of relay BR in the test set, contacts 6 of plug BP and SBS through the balancing network 105 to ground. The test operator may operate the keyboard KB to transmit messages and will receive messages from the central office on the printer. When key 250 is operated to establish communication with the central office it is necessary that key 240 be operated away from its left position thereby disconnecting the biasing windings on relay BR.

Upon completion of the measurements all keys are restored to normal position, the plug BP is removed from the subscriber's circuit and relay BR is removed from the measuring set and returned to the subscriber's circuit.

*Method of operation in connection with an A-type subscriber*

Relay AR is first removed from the subscriber's A socket SAS and inserted in the socket AS in the measuring set. The plug portion AAP of the adapter is then inserted in socket SAS and the plug BP is inserted in the socket ABS of the adapter.

With the key RK in normal position, the line circuit may be traced from the transmitter T at central office CO over conductor 100, lower conductor of line LA, sleeve circuit of jack 124, cord 123 and jack 122, through the keyboard contacts KB, contacts 6 of socket SAS and plug AAP, contacts 1 of socket ABS and plug BP, conductor 1 to normal contact c of key 230; the other side of the line circuit may be traced from battery 132 at the central office over the upper line conductor LA to the circuit of jack 124, cord 123 and jack 122, contacts 3 of socket SAS and plug AAP, contacts 2 of socket ABS and plug BP, conductor N2, normal contact 3 of key RK, contacts 3 of socket AS and the relay base of relay AR, operating winding 3—6, contacts 6 of relay base and socket AS, normal contacts 6 of key RK, conductor N1 to normal contact d of key 230; from contacts c and d of key 230 the line circuit may be extended through to the meter as over a circuit previously traced by operating key 230 to its center position. Relay AR thus receives line current through winding 3—6, normally operating the relay armature to its marking contact in response to a marking or current condition in the line circuit.

The biasing winding 2—7 of relay AR is supplied with biasing current to operate the relay to spacing over a circuit extending from the winding 2-7 over contact 7 of socket AS, normal contact 7 of key RK, conductor N11, normal contacts b and d of key 240, conductor 11, contacts 11 of plug BP and socket ABS, contacts 7 of plug AAP and socket SAS, through battery 125 then over contacts 2 of socket SAS and plug AAP, contacts 12 of socket ABS and plug BP, conductor 12, normal contacts c and a of key 240, normal contact h of key 230, conductor N12, normal contact 2 of key RK, contacts 2 of socket AS and relay AR back to winding 2—7.

The armature of relay AR is connected over contact 1 of socket AS to conductor N14 and over normal contact a of key 250 to the meter circuit previously described. The marking contact of relay AR is connected over contact 4 of socket AS, normal contact 4 of key RK to conductor N13 over normal contact e of key 250, conductor 213 to plus conductor 264. The spacing contact of relay AR is connected over contact 5 of socket AS, normal contact 5 of key RK, conductor N15, normal contact d of key 250, conductor 215 to negative conductor 263.

Thus the contacts of relay AR may be associated with the meter circuit or with the subscriber's printer magnet PM in accordance with the operation of key 250, as described in connection with the B-type relay BR.

For the purpose of controlling the biasing current through relay AR, as in the case of some of the tests described above with relay BR, the key 240 will be operated to the left thereby disconnecting conductors N11 and N12 at normal contacts c, d from conductors 11 and 12 leading to the bias current source 125 at the subscriber's station and connecting conductors N11 and N12 over the alternate contacts c, d to conductors 283 and 284 leading to the bias potentiometer 281.

When it is desired to insert the meter in this biasing circuit key 230 is operated to the left thereby opening normal contact h and extending conductor N12 over alternate contacts d and c through the meter circuit.

The readings obtained in the test for total systematic distortion of course include the bias, the value of which is obtained in the bias test with 23 cycles per second reversals. After subtraction of the bias from the total distortion, the remaining values will represent the characteristic distortion corresponding to the different test characters.

In Fig. 5 there is shown a diagram in which the relation between the characteristic distortion and the separation between the start and the reverse transition of the undistorted test characters is plotted in the form of two curves based on measurements taken on two different types of line circuits. In the diagram, the spacings between the start and the reverse transition for the different characters are laid out along the abscissae and the percentage distortion along the ordinates. The curve D—1 is drawn from observations on a simplex phantom circuit and shows that the circuit introduced positive characteristic distortion practically over the entire range. The curve D—2 is based upon observations on a metallic line and shows both negative and positive characteristic distortion.

In the foregoing description it has been assumed that the test signals as applied at the central office CO were perfect signals, that is, signals in which the reverse transition occurred exactly at the normal transition points relative to the start transition. Thus the information obtained by the series of tests was based on this assumption, and deductions as to the condition of the line circuit under commercial operations and as to remedial measures for correcting the line conditions would be similarly limited.

However, in commercial service it often happens that the signals impressed upon line circuits, such as LA and LB shown in Fig. 1, originate at some other station, distant from the central office CO, and are impressed upon the line circuit under observation through repeating equipment at the central office. In such case the repeated signals impressed upon the line circuit will usually be more or less biased and it is likely that the characteristic distortion of the line circuit under such conditions may greatly exceed those observed wtih perfect signals, that is, the imperfect signals may include separations between the transitions which are not found in the standard signals.

It may, therefore, be found desirable, especially in cases that show large distortion at one or some of the test characters, to make special tests to insure more complete information in the neighborhood of the greatest observed distortion.

For this purpose the entire tests outlined above may be repeated, with test signals supplied at the central office with a known amount of bias. For the introduction of bias, a bias introducing set may be used of the type disclosed in Patent 2,140,680, issued on December 20, 1938, to H. A. Rhodes. Such a set is indicated diagrammatically and designated "BIS" in Fig. 3 and may be inserted in the conductor 100 by means of plug 351 and jack 352. By this arrangement the perfect signals produced by the transmitting equipment may be repeated through the circuit BIS with a known amount of bias of any value within the usual range.

For a particular observation the transmitting circuit may be set to send the test character LTR with a 35 per cent marking bias. The measuring set at the subscriber's station may be adapted especially for making tests in response to test characters with different amounts of bias by having the potential divider 270 arranged with adjustable contacts on the potentiometer 274 for the connections from the right-hand contacts 271, with the object of being capable of compensating for the inherent bias also of the artificially biased test signals. Or the potential divider 270 may instead be provided with special contacts for engagement with the slide 273 corresponding to predetermined amounts of bias artifically introduced in the test characters at the central office.

Thus with the transmitting equipment adjusted as referred to above, the potential divider 270 may have an additional position marked "p" in Fig. 2, adjacent to the position LTR, the right-hand contact of which is connected to a point on potentiometer 274 corresponding to the time ratio between the spacing interval from the start transition to the reverse transition at point p in Fig. 5 and the marking impulse from the reverse transition at p to the next start transition. With the slide 273 in position p, the meter will thus show zero in the absence of distortion due to the line circuit and will indicate the distortion in per cent, as in the previously described tests.

What is claimed is:

1. A start-stop telegraph signaling line circuit to be tested, transmitting means connected for sending start-stop signals into one end of said line circuit, a meter circuit connected to receive said signals from the other end of said line circuit, said transmitting means being adapted to produce said start-stop signals as a continuously repeated test series of transitions including the start transition and one subsequent reverse transition occurring at a normal transition point of the start-stop code used in the normal operation of the said line circuit, and said meter circuit including an integrating meter responsive to said repeated test series to indicate the average displacement from its normal point suffered by said reverse transition, and circuit means for controlling the meter current to produce no meter deflection in response to zero displacement of said received reverse transition.

2. A start-stop telegraph signaling line circuit to be tested, transmitting means connected for sending start-stop signals into one end of said line circuit, a meter circuit connected to receive said signals from the other end of said line circuit, said transmitting means being adapted to produce said start-stop signals as a continuously repeated test series of transitions including the start transition and one subsequent reverse transition occurring at a normal transition point of the start-stop code used in the normal operation of the said line circuit, and said meter circuit including an integrating meter responsive to said repeated test series to indicate the average displacement from its normal point suffered by said reverse transition, and a source of direct current potential, receiving relay means comprising contact means connected to apply alternately a high and a low potential from said source to one side of said meter, said meter having its other side connected to an intermediate potential of said source, one of said potentials being adjustable for controlling the meter current to produce no meter deflection in response to zero displacement of said received reverse transition.

3. A start-stop telegraph signaling line circuit to be tested, transmitting means connected for sending start-stop signals into one end of said line circuit, a meter circuit connected to receive said signals from the other end of said line circuit, said transmitting means being adapted to produce said start-stop signals as a continuously repeated test series of transitions including the start transition and one subsequent reverse transition occurring at a normal transition point of the start-stop code used in the normal operation of the said line circuit, and said meter circuit including an integrating meter responsive to said repeated test series to indicate the average displacement from its normal point suffered by said reverse transition and said transmitting means including test code changing means adapted to at successive intervals shift said reverse transition to each of the successive normal transition points of the said start-stop code and said meter circuit further including a source of direct current potential, receiving relay means comprising contacts connected to apply alternately opposite potentials from said source to one side of said meter, potentiometer means connected to apply an intermediate potential from said source to the other side of said meter, and switching means having a plurality of position contacts connected to corresponding potential points on said potentiometer means and having a common contact for successive engagement with said position contacts and connected to said other side of said meter for in each position controlling the meter current to produce no meter deflection in response to zero displacement of the said correspondingly shifted reverse transition.

4. A method of measuring signal distortion in a start-stop telegraph line circuit which comprises repeatedly sending into one end of said line circuit a test signal series of impulses conforming in the timing of each of its transitions to a start-stop signal series used in the normal operation of said line circuit, at intervals during said repeated sending of the test signal series varying the test signal series by shifting one of its transitions to different timings to cause the test signal series to conform during successive intervals to different start-stop signal series used in the normal operation of said line circuit, and measuring at the other end of said line circuit the distortions of said test signal series during each interval to determine at which of the said different timings the maximum distortion is produced, said intervals each being long enough to permit a reading of the integrated effect upon an indicating device of a plurality of said test signal series.

5. A method of measuring signal distortion in a start-stop telegraph line circuit which comprises continuously sending into one end of said line circuit test signal series of impulses each having the same total length and including the same number of fixed transition points with the same corresponding separations as the signal series used in the normal operation of said line circuit and each including only the normal start transition and a subsequent reverse transition, at intervals including several signal series shifting said reverse transition to occur successively at the said different fixed transition points, and measuring during each of said intervals the distortion of the test signal series as received at the other end of said line circuit to determine the transition point which shows the greatest distortion.

6. A method in accordance with claim 5 further comprising the step of compensating at said other end for the inherent bias of the test signal series and adjusting the compensation at the beginning of each of said intervals to correspond to the said inherent bias at the said differently shifted reverse transition.

7. A method of measuring signal distortion in a start-stop telegraph line circuit which comprises repeatedly sending into the line circuit a test series of transitions including the start transition and one subsequent reverse transition occurring at a normal transition point of the start-stop code used in the normal operation of said line circuit, at successive intervals during the repeated sending of said test series shifting the said reverse transition to each of the successive normal transition points of the code, receiving said repeated test series at the other end of the line circuit, during each of said intervals impressing the received series upon a meter circuit for determination of the transition point at which the said reverse transition suffers the greatest displacement from normal by the transmission over said line circuit, and at the beginning of each of said intervals adjusting the meter current to produce no meter deflection in response to zero displacement of the correspondingly shifted reverse transition each of said intervals including several of said test series.

FRANK A. COWAN.
HAROLD A. RHODES.